3,234,033
DENTAL IMPRESSION MATERIALS
Jacque C. Morrell, 8 Oxford St., Chevy Chase, Md.
No Drawing. Filed June 17, 1964, Ser. No. 375,957
20 Claims. (Cl. 106—35)

This invention relates to dental impression compositions particularly of the alginate type and is a continuation-in-part of my application, Serial No. 158,943, filed December 8, 1961.

A primary objective is to produce compositions which provide dental impressions possessing the qualities of elasticity and resilience as well as rigidity and toughness or strength so balanced that precision dental impressions may be made and removed from undercuts without rupture or permanent deformation. A specific requirement in dentistry is making dentures, both full and partial, as well as bridges, is accurate dental reproduction with maximum comfort to the patient, and this is also a general objective of my invention.

It is among the further objectives of this invention to produce models or casts from such impressions that possess hard smooth surfaces free from chalkiness and dusting in handling during use of the same or in storage.

Another important objective of my invention is the production of a dental impression composition which is readily wetted and mixed with water to a smooth consistency with controlled setting time.

A further objective of the invention is to produce dental impression compositions which have long storage and shelf life, that is they show minimum or no deterioration with age during use and normal exposure to atmospheric conditions including warm and humid conditions.

Moreover the impressions made from my compositions require no fixing or after treatment in special solutions or baths which involve additional time and material and increased cost generally. The fixing operation refers to treatment of the impression after it has been made. In the earlier developments and until compartively recently, this operation was necessary before pouring or applying the dental "stone" (generally a composition containing some form of plaster of Paris) to the impression to make a satisfactory model or cast. The fixing baths consisted of aqueous solutions of various inorganic salts and these materials, as well as the time and cost, are eliminated by the use of my composition.

Among the essential ingredients or components of my invention in its major or primary aspect are (a) the alginates especially the water soluble types such as the alkali metal alginates, e.g., sodium or potassium or ammonium alginates (b) calcium sulphate preferably in the dihydrate form, although the anhydrous and hemi-hydrate types also give good results; and (c) I also as a principal feature of my invention make use of certain selected fluorides specifically the fluorides of aluminum and magnesium and others related to these which are hereinafter referred to. In addition to these fluorides of aluminum and magnesium used as such in my impression mixtures, I make use of various combinations of this group with each other, as well as with zinc fluoride, and with the alkali metal fluorides of potassium and sodium as well as with lithium fluoride. I also make use of these fluorides of magnesium and aluminum in combination with certain metal oxides either as mixtures or non-equivalently by combining the corresponding oxides, e.g., of magnesium or aluminum with the acid fluorides to obtain a novel group of fluorides used by me in my invention. These oxides generally have the property of neutralizing acids. These and other novel combinations hereinafter referred to are employed by me. The amounts of these fluorides used in my impression mixtures may vary from about 1% to about 10% by weight, and preferably from about 1% to about 5%.

The calcium sulphate in the mixture reacts with the water soluble alginates to form an elastic and resilient impression base on the one hand, and it also reacts with the fluorides to form the insoluble calcium fluoride. The specific reactions and interreactions of these essential materials and those disclosed herein generally appear to be a prime requirement to produce the superior results I obtain, and to meet the foregoing objectives. In addition to these essential ingredients, I also make use of retarders, generally salts of an alkaline character such as tetrasodium pyrophosphate to control the rate of the reactions and to prevent premature setting; and I also make use of fillers such as diatomaceous earth (and other generally inert and water insoluble materials), for bulk and as a diluent of the more active ingredients. All of the materials are thoroughly mixed and in a finely divided state of subdivision, and when it is desired to use the resulting composition, it is admixed with water in proper proportions to form the impression, the details of which are fully described hereinafter. These and other aspects of my invention will be discussed and set forth more fully below.

The soluble salts of alginic acid (which is the essential gel forming material in various marine algae or plants), especially the potassium, sodium and ammonium alginates or mixtures of the same are suitable for my invention. The commercial product known as "Improved Kelmar" has been found very satisfactory. Calcium sulphate in the form of the anhydrous salt ($CaSO_4$), or the hemihydrate ($CaSO_4 \cdot \frac{1}{2} H_2O$) and preferably the dihydrate ($CaSO_4 \cdot 2H_2O$) may be employed. The soft soluble alginate is converted into the resilient and elastic insoluble type in an aqueous medium by interaction with calcium sulphate. The retarder which controls the rate of setting of the impression mixture may comprise a salt having an alkaline reaction generally such as sodium carbonate or trisodium orthophosphate or meta phosphate but I prefer the tetrasodium pyrophosphate for this purpose. With regard to the fillers, I prefer diatomaceous earth (e.g., the commercial product referred to as Hyflo-Super-Cal). However (although less desirable), other substantially inert and water insoluble materials such as calcium fluoride, carbonate or triphosphate, as well as various finely divided earths or clays and minerals, e.g., bentonite, talc, kaolin, etc., and various silicates such as those of the alkaline earth metals and those of aluminum and the heavier metals, e.g., lead silicate, and water insoluble oxides such as, for example, aluminum oxide or magnesium oxide alone or in admixture with the diatomaceous earth, or with each other, could be employed with varying results; especially in addition to diatomaceous earth.

As one of its principal aspects and as a major feature of my novel impression mixtures, I make use of one or more of the fluorides mentioned, namely, those of magnesium or aluminum in combination with the use of the aforementioned alginates and with calcium sulphate as essential ingredients of my composition. The principal reaction of calcium sulphate with the soluble alginate has already been referred to. The reactions which may occur between the calcium sulphate and the fluorides of the alkaline earth metals may be explained as follows:

Calcium sulphate is soluble in water to the extent of 0.2%, and the fluoride of magnesium, for example, is dissolved to the extent of 0.009%. However, calcium fluoride is soluble in water only to the extent of 0.002%, and the free calcium and fluoride ions furnished by the calcium sulphate and the magnesium fluoride respectively are considerably in excess of the concentration required to precipitate them as calcium fluoride. The reaction thus goes forward until one of the other of the reactants is exhausted. It is thus noted that even with such a small concentration of fluoride ions as those furnished by the relatively insoluble magnesium fluoride will cause precipitation of the even less soluble calcium fluoride. The same principle applies to aluminum fluoride. The reactions may be illustrated as follows:

(1) $MgF_2 + CaSO_4 \rightarrow CaF_2 + MgSO_4$
(2) $AlF_3 + 3CaSO_4 \rightarrow CaF_2 + Al_2(SO_4)_3$ Whatever may be the explanation of the reaction in an aqueous medium or sequence of reactions in the mixture in relation to the physical properties of the impression and the "stone" model or cast made from the same, the result is an impression which is smooth and accurately defined and may be readily removed without breakage or distortion. Moreover, the model or cast made from these impressions are of a high degree of precision and part cleanly from the latter without adhesion and have glossy, flintlike non-dusting and non-chalking surfaces of a highly superior type.

I believe in this connection that I am the first to use the fluorides mentioned namely those of aluminum and magnesium and combinations mentioned herein, in impression mixtures containing them and in addition containing the other essential ingredients namely the soluble alginates and calcium sulphate.

The amount of the fluorides mentioned which I may incorporate in my impression mixtures may vary from about 1% to about 10% by weight with a preferred range of from about 2% to about 5% more or less.

In another aspect of my invention, I may utilize the fluoride component of the metals mentioned, i.e., aluminum or magnesium in conjunction with or in combination with the alkali metal fluorides to improve the results obtained with the latter. I am aware that the use of alkali metal fluorides of potassium and sodium have been disclosed. However, the complex products of this aspect of my invention are a very distinct improvement especially over the alkali metal fluorides (and others) when used alone. The following illustrates one method of preparing the novel combination $2KF.HF + MgO \rightarrow 2KF.MgF_2 + H_2O$ The resulting potassium magnesium fluoride, in this instance made from potassium acid fluoride, appears actually to be a complex addition compound judging from its properties, but in an aqueous medium the reaction proceeds like a mixture, and in any event whatever the explanation the resulting impression and cast is far superior to that made with potassium fluoride alone. It is noted in this connection that the acid potassium fluoride and the impression product made with it is worthless when used alone in the mixture. Corresponding combinations of or addition compounds to that shown namely $2KF.MgF_2$ of magnesium and aluminum fluorides with sodium, lithium and zinc fluorides, e.g., $2NaF.MgF_2$; $2LiF.MgF_2$; $ZnF_2.MgF_2$ and the entire series with $AlF_3$ combined with the fluorides of potassium, sodium, lithium and zinc may be employed in connection with my invention. Also it is to be noted in connection with this aspect of my invention that while I show one method of producing the addition compounds or combinations as described, I am not limited to this method either here or in similar subsequently described fluoride materials. Direct treatment of the oxides or hydroxides or carbonates of the materials in question with hydrofluoric acid and other suitable methods may be employed.

Aluminum fluoride may also be combined with the alkali fluorides, potassium and sodium as described above to form addition products or combinations generally having unique properties, e.g., $3KF.AlF_3$ and $3HaF.AlF_3$ (or their equivalents so far as results generally are concerned in use as mixtures); and as indicated above similar addition compounds or combinations may be prepared between aluminum fluoride and lithium fluoride or magnesium fluoride and be employed by me.

It is emphasized that the compounds or combinations described above show greatly superior results when used in impression mixtures of the type already described in comparison to the use of the alkali metal fluoride alone; and is a convenient way of utilizing the latter to get greatly improved results employing from about 1% to about 10% of the addition products with a preferred range of from about 2% to about 5% of the impression mixture. As stated previously it appears that the various combinations are chemical compounds in the solid state and with molecular proportions shown, and that they react in the same manner as mixtures, so far as the end products are concerned in an aqueous medium. Mixtures of the compounds also come within the purview of my invention in view of improved results over the alkali fluorides alone.

In all of the cases described the fluorides as such, e.g., those of magnesium and aluminum or in the combinations shown are non-equivalent.

In general each of the fluoride compounds as well as the combinations claimed by me exert their own individual effects in the final result as well as in the process of use. These differences can even be observed in two such similar substances of the prior art, namely, potassium and sodium fluorides, and the differences are even much greater between these and the fluoride materials singly and in combination described in connection with my invention.

Numerous examples could be given in connection with my invention of the use of acid fluorides in combination with oxides which can be simply illustrated as follows:

$3MgF_2.2HF + Al_2O_3 \rightarrow 3MgF_2.2AlF_3 + 3H_2O$

The same compound may be formed when mixtures of the acid fluoride of aluminum and magnesium oxide are employed. Likewise, while not preferred, zinc oxide may be employed with the acid fluorides, e.g.

$MgF_2.2HF + ZnO \rightarrow MgF_2.ZnF_2 + H_2O$

In another important aspect of my invention referred to above I may employ lithium fluoride in my dental impression mixtures.

I may also employ the fluorides of my invention namely in combination with the other fluorides of my invention to stabilize the zinc fluoride mixture, e.g., $MgF_2.ZnF_2$ and combining the acid fluoride of magnesium with zinc oxide or the hydroxide or carbonate or by any suitable method. Other combinations may likewise be prepared. The amounts used in the mixtures are from about 1% to about 10% by weight; with about 2% to about 5% preferred.

It may be noted particularly that the results observed with my new dental compositions employing magnesium fluoride and aluminum fluoride and the complex compounds or combinations and mixtures of the same noted above are greatly superior to the use of mixtures containing the fluorides of the prior art namely those of sodium, potassium or zinc when used singly.

Despite the fact that potassium and sodium fluoride are both alkali fluorides the former is soluble in water to the extent of 92.5% while sodium fluoride dissolves only to the extent of 4.5%. Potassium fluoride is very difficult to handle because it is highly deliquescent, and moreover the results of making impression mixtures and impressions are somewhat unreliable because of unpredictable working ranges in time of mixing, effect of temperatures, setting times and other control difficulties. Mixtures employing sodium fluoride alone are somewhat better in these respects than potassium but the results with regard to impressions and casts in both cases leave much to be desired; and in fact when used alone both potassium and sodium fluoride dental impression compositions have been found to be impractical in actual commercial use.

Compositions containing zinc fluoride as the sole fluoride give much better results so far as control and quality of impression and the cast is concerned, but such compositions have been found to be notoriously unstable or have short shelf life especially in a warm and humid environment rendering the product useless for casts and impressions.

As another special aspect of my invention, I may add the oxide corresponding to the fluoride for example aluminum oxide (e.g., the hydrated or active oxide) to the mixture containing aluminum fluoride; magnesium oxide to the mixture containing magnesium fluoride or alternatively the oxides of magnesium to aluminum fluoride or the reverse namely the oxides of aluminum to magnesium fluoride. The amounts used for illustration may be from about 1% to about 10% by weight or preferably about 1% to about 5%. It is to be noted in the above connection and in general with this aspect of my invention that I refer to these oxides as metal oxide neutralizers because in general they (as well as the other compounds referred to below) show an alkaline reaction in neutralizing acids, e.g., HF.

The selected neutralizing agent (which functions under adverse conditions to stabilize the mixture) may be a metal oxide, or hydrated oxide, or carbonate of magnesium, aluminum and the like. These neutralizing agents are insoluble in water or only slightly soluble and neutralize acids. Some further examples of these are calcium oxide or carbonate in small amounts and the hydroxides of magnesium or aluminum.

Of these the oxides are preferred, especially magnesium oxide. Also in those cases where the addition of an oxide or similar acid neutralizing agent is indicated (such as with zinc fluoride) the fluorides corresponding to the oxide added are very sparingly soluble in water. Moreover, in general I may add metal oxides, or the other types of compounds mentioned on a selective basis with regard to type and amount to all of the mixtures containing the various fluorides comprising my invention.

While I do not intend to be bound by an explanation or theory of the mechanism of protection, I have observed that the presence of free hydrofluoric acid in the impression mixtures, e.g., the use of acid fluorides, is very deleterious and is clearly observable in "graining" during mixing and in the unsuccessful attempts in making impressions and casts. The presence of hydrofluoric acid in mixtures containing zinc fluoride might be accounted for by hydrolysis of the latter when exposed to a moist and warm atmosphere and the breakdown phenomenon are comparable. The reaction may be represented as follows:

$$ZnF_2 + H_2O \rightleftharpoons 2HF + ZnO$$

The addition of zinc oxide would repress the formation of hydrofluoric acid; and the addition of the other oxides or compounds mentioned would also repress or neutralize this reaction.

The same combinations may be made with lithium acid fluoride and the oxides of magnesium, barium and strontium, as well as zinc oxide and aluminum oxide, or by other suitable methods, to produce the corresponding double fluorides and/or intimate mixtures of the same. These are $2LiF \cdot MgF_2$; $2LiF \cdot BaF_2$; $2LiF \cdot ZnF_2$; and $3LiF \cdot AlF_3$.

The reactions may be illustrated by the following:

$$2LiF \cdot HF + MgO \rightarrow 2LiF \cdot MgF_2 + H_2O$$

$$2LiF \cdot HF + ZnO \rightarrow 2LiF \cdot ZnF_2 + H_2O$$

The amounts of each of the combinations used in the impression mixture referred to above may vary from about 1% to 10% with the preferred range of 2% to 5%.

It is to be specifically emphasized that none of the fluorides mentioned are in any sense equivalents and that of the various fluorides referred to, and of the mixtures containing them, I prefer the fluorides of magnesium and aluminum.

With reference to possible formation of traces of small amounts of hydrofluoric acid for example in the use of zinc fluoride and possible deleterious temperature and humidity effects causing spoilage of the impression mixture remedied as I have set forth above by the addition of the oxides, hydroxides and carbonates of magnesium, aluminum, etc., to the mixture. Another method of avoiding the formation of hydrofluoric acid and in general the deleterious effects of aging dental impression mixtures containing certain metal fluorides is the use of buffers. The latter may be defined for present purposes as materials which resist change in acid concentration or pH. The substances I employ as buffers are generally salts of strong bases and weak acids, for example the sodium and potassium salts or organic acids such as acetic, tartaric, citric and the like, and the corresponding types of inorganic salts, the carbonate and bicarbonate of sodium and potassium. These compounds hydrolyze to form strong bases and weak acids, the bases neutralizing any hydrofluoric acids formed and the weak acids in the amounts present being unobjectionable.

The surfaces of the impression have a profound effect from both the physical and chemical viewpoint on the surface of the stone cast or model especially to produce a hard, smooth surface without dusting or chalkiness.

Having described the various materials which may be employed in connection with my invention, and pointed out certain variations in the practice, I shall proceed to show more particularly the steps of the process of its application together with the preferred materials and their preparation to obtain best results.

Reverting to the manner in which my impression mixtures may be used and to the most suitable proportions for their use: The ingredients or components of the compositions of my impression mixtures which I have referred to above as preferred materials, i.e., the soluble alginate, e.g., potassium alginate (a suitable form is Improved Kelmar), calcium sulphate dihydrate; the retarder, tetrasodium pyrophosphate; one (or a combination of) the fluorides referred to above, e.g., magnesium fluoride; the alkaline water insoluble neutralizer, e.g., magnesium oxide, and the filler, diatomaceous earth (e.g., Hyflo-Super Cal).

All of the materials should be in finely divided form, and thoroughly mixed. On a generalized basis, the proportions of materials may vary considerably. Satisfactory results may be obtained within the following illustration of range and intermediate compositions shown for convenience in parts per one hundred parts by weight or percent.

| Material | Parts by Weight or Percent | | |
|---|---|---|---|
| | Range | Intermediate Compositions | |
| | | (1) | (2) |
| Potassium Alginate | 12–15 | 13.5 | 13.0 |
| Calcium sulphate dihydrate | 12–16 | 12.5 | 15.0 |
| Retarder (Sodium Pyrophosphate)* | 1–5 | 2.0 | 3.5 |
| Fluoride (e.g. $MgF_2$, $AlF_3$) | 2–5 | 4.2 | 2.9 |
| MgO Oxide (Metal Oxide Neutralizer) | 0–6 | 1.5 | 5.0 |
| Filler—Diatomaceous Earth | 73–53 | 66.3 | 60.6 |

*Amount depends on type and amount of fluoride.

Variations in the proportions of ingredients may be on an even wider basis than shown in the above illustration for example as already pointed out, the fluoride depending on the one selected may vary from about 1% to 10% and the calcium sulphate, dependent on the type and the extent of hydration and other ingredients from about 10% to about 20%. The filler will vary in amount with the variation in the other ingredients; and where the diatomaceous earth is supplemented by some other filler, e.g., bentonite kaolin, calcium or magnesium carbonate, etc., the proportions used of the former are less.

In the production of the dental impression material all components or ingredients are reduced to finely divided or powdered form and sieved to about 80 mech in size, or finer. After mixing in a suitable type of mechanical mixer (such as a rotary helicoid ribbon type or double cone or other efficient tumbling type) the lumps may be broken down by passing through a coarse mechanical sieve. At this stage, the material is ready for packaging and distribution for use. Flavoring or coloring material may be introduced after mixing with a small amount of diatomaceous earth, calcium or magnesium carbonate or magnesium oxide.

Specific examples

The table shows a number of specific examples in connection with various compositions and ingredients each in general being to some degree dependent on the specific type of fluoride employed, although they need not necessarily be widely different for best results and, on the other hand, may vary considerably, in accordance with desired results.

| Ingredients, Percent by Weight | $MgF_2$ Magnesium Fluoride | $MgF_2$ Magnesium Fluoride | $AlF_3$ Aluminum Fluoride | $AlF_3$ Aluminum Fluoride | $2KF.MgF_2$ Potassium Magnesium Fluoride | $3KF.AlF_3$ Potassium Aluminum Fluoride |
|---|---|---|---|---|---|---|
| Potassium Alginate | 13.5 | 13.5 | 13.8 | 13.5 | 13.5 | 13.5 |
| Calcium Sulphate Dihydrate | 12.5 | 12.5 | 12.5 | 12.5 | 12.3 | 12.5 |
| Retarder Tetrasodium Pyrophosphate | 2.0 | 2.0 | 2.3 | 2.2 | 1.5 | 2.2 |
| Fluoride, etc. (See above) | 4.2 | 4.2 | 4.2 | 4.1 | 4.0 | 4.2 |
| Magnesium Oxide | | 1.5 | 3.5 | | 0.0 | 1.5 |
| Filler Diatomaceous Earth | 67.8 | 66.3 | 63.7 | 67.7 | 68.8 | 66.1 |
| Example # | (1) | (2) | (3) | (4) | (5) | (6) |

Remarks: Good but non-equivalent results may be obtained also with: (a) Compositions like Examples 5 and 6 in which $2 NaF.MgF_2$ and $3 NaF.AlF_3$ are the fluorides used. (b) Compositions like Examples 5 and 6 in which $2 LiF.MgF_2$ and $3 LiF.AlF_3$ are the fluorides used. (c) Compositions like Examples 5 and 6 in which $ZnF_2.MgF_2$ and $3ZnF_2.2AlF_3$ are the fluorides used. (d) Substitutions of filler and type of calcium sulphate may be made with some adjustment of other materials. (e) Variations in the amount of MgO used.

When used by the dentist, the impression material prepared as described is mixed with water generally at room temperature to the consistency of a somewhat heavy, smooth, creamy paste-like material. Spatulation of the wet mixture may take place in about one half to one minute, and it is then transferred to the tray to be applied to the mouth. Generally, the latter operation takes place in about a minute or a minute and a half, and the material is allowed to set for about three and one-half to four minutes in the mouth; the whole operation consuming about six minutes. The proportion of water used is about 10 to 10.5 gms. of the powdered impression mixture to about 25 cc. of water, or generally a ratio of 2.5 parts of water to 1 part of the material. All of these data are illustrations only.

All of the above data on use may vary somewhat, those shown being illustrative of satisfactory conditions for good results.

The temperature of the water, as well as the room temperature, though not critical, have a very appreciable effect on the setting time, decreasing with increase in temperature and vise versa. This is in accord with effect of temperature generally on reaction rates. Generally room temperatures, depending on individual taste, varies between about 68° F. and 74° F. and this is a satisfactory working range, although good results may be obtained in a somewhat wider range with minor adjustments.

Any suitable dental "stone" (generally a plaster of Paris composition) of which there are a number available, made up to proper consistency with water, may be employed in making the "stone" cast or model. Moreover, as previously stated, fixing is eliminated, that is the impressions made with my compositions do not have to be treated in a fixing bath or solution prior to making the cast or model, and the latter, with the use of my invention, are hard, smooth and durable.

There may be many modifications of my invention without departing from the spirit and scope thereof, and any limitations to be imposed should be only those in accordance with the appended claims.

I claim:

1. A dental impression composition consisting essentially of a mixture of an alkali metal alginate, calcium sulphate, a metal fluoride and an inert filler, the said fluoride being selected from the group consisting of magnesium and aluminum fluorides, and being present in an amount of from about 1% to about 10%, said fluoride being adapted to eliminate fixing of said composition while maintaining controlled setting time and minimizing deterioration with age, and to provide smooth and accurate impression and casts.

2. A dental impression composition consisting essentially of a mixture of an alkali metal alginate, hydrated calcium sulphate, a metal fluoride, an inert filler, and a retarder, the said fluoride being selected from the group consisting of magnesium and aluminum fluorides, and being present in an amount of from about 1% to about 10%, said fluoride being adapted to eliminate fixing of said composition while maintaining controlled setting time and minimizing deterioration with age, and to provide smooth and accurate impression and casts.

3. A dental impression composition consisting essentially of a mixture of an alkali metal alginate, hydrated calcium sulphate dihydrate, a metal fluoride and an inert filler comprising diatomaceous earth, a retarder consisting of sodium pyrophosphate, the said fluoride being selected from the group consisting of magnesium and aluminum fluorides, and being present in an amount of from about 1% to about 10%, said fluoride being adapted to eliminate fixing of said composition while maintaining controlled setting time and minimizing deterioration with age, and to provide smooth and accurate impression and casts.

4. A dental impression composition consisting essentially of a mixture of an alkali metal alginate, hydrated calcium sulphate, a metal fluoride, a retarder, magnesium oxide and an inert filler comprising diatomaceous earth, the said fluoride being selected from the group consisting of magnesium and aluminum fluorides, and being present in an amount of from about 1% to about 10%, said fluoride being adapted to eliminate fixing of said composition while maintaining controlled setting time and minimizing deterioration with age, and to provide smooth and accurate impressions and casts.

5. A dental impression composition consisting essentially of an aqueous solution of an alkali metal alginate, hydrated calcium sulphate, a metal fluoride and an inert filler, the said fluoride being selected from the group consisting of magnesium and aluminum fluorides, and being present in an amount of from about 1% to about 10%, said fluoride being adapted to eliminate fixing of said composition while maintaining controlled setting time and minimizing deterioration with age, and to provide smooth and accurate impression and casts.

6. A dental impression composition consisting essentially of a mixture of an alkali metal alginate, calcium sulphate dihydrate, a metal fluoride and an inert filler comprising diatomaceous earth, a retarder consisting of sodium pyrophosphate and a neutralizer consisting of magnesium oxide, the said fluoride being selected from the group consisting of magnesium and aluminum fluorides, and being present in an amount of from about 1% to about 10%, said fluoride being adapted to eliminate fixing of said composition while maintaining controlled setting time and minimizing deterioration with age, and to provide smooth and accurate impression and casts.

7. A dental impression composition consisting essentially of a mixture of an alkali metal alginate, hydrated calcium sulphate, a metal fluoride and an inert filler, the said fluoride being selected from the group consisting of magnesium and aluminum fluorides, and being present in an amount of from about 2% to about 5%, said fluoride being adapted to eliminate fixing of said composition while maintaining controlled setting time and minimizing deterioration with age, and to provide smooth and accurate impression and casts.

8. A dental impression composition consisting essentially of a mixture of an alkali metal alginate, hydrated calcium sulphate, a metal fluoride, an inert filler, a retarder, and a neutralizer the said fluoride being selected from the group consisting of magnesium and aluminum fluorides, and being present in an amount of from about 2% to about 5%, said fluoride being adapted to eliminate fixing of said composition while maintaining controlled setting time and minimizing deterioration with age, and to provide smooth and accurate impression and casts.

9. A dental impression composition consisting essentially of a mixture of an alkali metal alginate, calcium sulphate dihydrate, a metal fluoride and an inert filler comprising diatomaceous earth, a retarder consisting of sodium pyrophosphate and a neutralizer consisting of magnesium oxide, the said fluoride being selected from the group consisting of magnesium and aluminum fluorides, and being present in an amount of from about 2% to about 5%, said fluoride being adapted to eliminate fixing of said composition while maintaining controlled setting time and minimizing deterioration with age, and to provide smooth and accurate impression and casts.

10. A dental impression composition consisting essentially of a mixture of an alkali metal alginate, hydrated calcium sulphate, a metal fluoride, a metal oxide neutralizer and an inert filler, the said fluoride being selected from the group consisting of magnesium and aluminum fluorides, and being present in an amount of from about 1% to about 10%, said fluoride being adapted to elimnate fixing of said composition while maintaining controlled setting time and minimizing deterioration with age, and to provide smooth and accurate impression and casts.

11. A dental impression composition consisting essentially of a mixture of an alkali metal alginate, hydrated calcium sulphate, a metal fluoride, a metal oxide neutralizer consisting of magnesium oxide, an inert filler, and a retarder, the said fluoride consisting of magnesium fluoride, and being present in an amount of from about 1% to about 10%, said fluoride being adapted to eliminate fixing of said composition while maintaining controlled setting time and minimizing deterioration with age, and to provide smooth and accurate impression and casts.

12. A dental impression composition consisting essentially of a mixture of an alkali metal alginate, hydrated calcium sulphate, a metal fluoride and an inert filler the said fluoride consisting of magnesium fluoride combined with another fluoride selected from the group consisting of potassium fluoride, sodium fluoride, lithium fluoride and zinc fluoride and being present in a total amount of from about 1% to 10% said fluoride being adapted to eliminate fixing of said composition while maintaining controlled setting time and minimizing deterioration with age, and to provide smooth and accurate impressions and casts.

13. A dental impression composition consisting essentially of a mixture of an alkali metal alginate, hydrated calcium sulphate, a metal fluoride and an inert filler the said fluoride consisting of a luminum fluoride combined with another fluoride selected from the group consisting of potassium fluoride, sodium fluoride, lithium fluoride and zinc fluoride and being present in a total amount of from about 1% to 10% said fluoride being adapted to eliminate fixing of said composition while maintaining controlled setting time and minimizing deterioration with age, and to provide smooth and accurate impression and casts.

14. A dental impression composition consisting essentially of a mixture of an alkali metal alginate, hydrated calcium sulphate, a metal fluoride, an inert filler, a retarder and a neutralizer consisting of magnesium oxide, the said fluoride consisting of magnesium fluoride combined with another fluoride selected from the group consisting of potassium fluoride, sodium fluoride, lithium fluoride and zinc fluoride and being present in a total amount of from about 1% to 10% said fluoride being adapted to eliminate fixing of said composition while maintaining controlled setting time and minimizing deterioration with age, and to provide smooth and accurate impressions and casts.

15. A dental impression composition consisting essentially of a mixture of an alkali metal alginate, hydrated calcium sulphate, a metal fluoride, an inert filler, a retarder and a neutralizer consisting of magnesium oxide, the said fluoride consisting of aluminum fluoride combined with another fluoride selected from the group consisting of potassium fluoride, sodium fluoride, lithium fluoride and zinc fluoride and being present in a total amount of from about 1% to 10% said fluoride being adapted to eliminate fixing of said composition while maintaining controlled setting time and minimizing deterioration with age, and to provide smooth and accurate impressions and casts.

16. A dental impression composition consisting essentially of a mixture of an alkali metal alginate, calcium sulphate, di-hydrate, a metal fluoride and an inert filler consisting of diatomaceous earth a retarder and a neutralizer consisting of magnesium oxide the said fluoride consisting of magnesium fluoride combined with another fluoride selected from the group consisting of potassium fluoride, sodium fluoride, lithium fluoride and zinc fluoride and being present in a total amount of from about 1% to about 10% said fluoride being adapted to eliminate fixing of said composition while maintaining controlled setting time and minimizing deteroriation with age, and to provide smooth and accurate impressions and casts.

17. A dental impression composition consisting essentially of a mixture of an alkali metal alginate, hydrated calcium sulphate, a metal fluoride and an inert filler the said fluoride consisting of aluminum fluoride and being present in a total amount of from about 1% to about 10% said fluoride being adapted to eliminate fixing of said composition while maintaining controlled setting time and minimizing deterioration with age, and to provide smooth and accurate impressions and casts.

18. A dental impression composition consisting essentially of a mixture of an alkali metal alginate, hydrated calcium sulphate, a metal fluoride and an inert filler, the said fluoride consisting of magnesium fluoride and being present in a total amount of from about 1% to about 10% said fluoride being adapted to eliminate fixing of said composition while maintaining controlled setting time and minimizing deterioration with age, and to provide smooth and accurate impressions and casts.

19. A dental impression composition consisting essentially of a mixture of an alkali metal alginate, hydrated calcium sulphate, a metal fluoride, a metal oxide neutralizer consisting of magnesium oxide, an inert filler and a retarder the said fluoride consisting of aluminum fluoride and being present in an amount of from about 1% to about 10%, said fluoride being adapted to eliminate fixing of said composition while maintaining controlled setting time and minimizing deterioration with age, and to provide smooth and accurate impressions and casts.

20. A dental impression composition consisting essentially of a mixture of an alkali metal alginate, calcium sulphate di-hydrate, a metal fluoride, a metal oxide neutralizer consisting of magnesium oxide, an inert filler consisting of diotomaceous earth, and a retarder the said fluoride consisting of magnesium fluoride and being present in an amount of from about 1% to about 10%, said fluoride being adapted to eliminate fixing of said composition while maintaining controlled setting time and minimizing deterioration with age, and to provide smooth and accurate impression and casts.

References Cited by the Examiner
UNITED STATES PATENTS

| | | | |
|---|---|---|---|
| 2,165,680 | 7/1939 | Stangenberg et al. | 106—38.5 |
| 2,422,497 | 6/1947 | Noyes | 106—38.5 XR |
| 2,623,808 | 12/1952 | Myers | 106—38.5 |
| 2,628,153 | 2/1953 | Noyes et al. | 106—38.5 XR |
| 2,769,717 | 11/1956 | Cresson | 106—38.5 XR |
| 2,837,434 | 6/1958 | Grumbine | 106—38.5 |
| 3,053,670 | 9/1962 | Nordin | 106—38.5 |

ALEXANDER H. BRODMERKEL, *Primary Examiner.*
MORRIS LIEBMAN, *Examiner.*